United States Patent [19]
Huang

[11] Patent Number: 5,278,388
[45] Date of Patent: Jan. 11, 1994

[54] PLASMA WELDING AND CUTTING GUN FOR DISCHARGING PLASMA GAS WITH CONSTANT OUTLET PRESSURE

[76] Inventor: Huang-Nan Huang, c/o Hung Hsing Patent Service Center, P.O. Box 55-1670, Taipei (10477), Taiwan

[21] Appl. No.: 71,999

[22] Filed: Jun. 7, 1993

[51] Int. Cl.$^5$ .................. B23K 10/00; B23K 10/02
[52] U.S. Cl. .................. 219/121.51; 219/121.48; 219/121.45; 219/121.55; 219/75
[58] Field of Search .................. 219/121.39, 121.44, 219/121.45, 121.46, 121.51, 121.55, 121.52, 74, 75, 121.48, 121.5; 313/231.31, 231.41

[56] References Cited

U.S. PATENT DOCUMENTS

| | | | |
|---|---|---|---|
| 4,973,816 | 11/1990 | Haberman | 219/121.48 |
| 5,132,512 | 7/1992 | Sanders et al. | 219/121.5 |
| 5,216,221 | 6/1993 | Carkhuff | 219/121.51 |

*Primary Examiner*—Mark H. Paschall

[57] ABSTRACT

A plasma welding and cutting gun for discharging plasma gas with constant outlet pressure includes a gun body having a negative-electrode jacket for directing welding and cutting gas into the gun, a core tube through which the gas flows through a gas outlet of the negative-electrode jacket disposed around the core tube and then discharged through a nozzle secured to a lower portion of the gun body, and a positive-electrode sleeve secured to an outer portion of the gun body and connected to the nozzle, wherein the nozzle serves as a positive-electrode terminal and the gas directed into a passage between the nozzle and a negative-electrode terminal secured to a lower portion of the negative-electrode jacket will be ionized by an arc formed between the nozzle and the negative-electrode terminal, and then discharged through the nozzle to form plasma arc of high temperature and high velocity for welding and cutting a work piece, and wherein an over-pressure relief valve is provided between the core tube and negative-electrode jacket for discharging a gas streamflow through a by-pass gas discharge passage when a main gas streamflow having its pressure exceeding a predetermined constant pressure, thereby keeping a constant gas pressure for the plasma main gas streamflow in order to enhance the stability and quality of plasma welding and cutting.

10 Claims, 2 Drawing Sheets

PLASMA WELDING AND CUTTING GUN FOR DISCHARGING PLASMA GAS WITH CONSTANT OUTLET PRESSURE

BACKGROUND OF THE INVENTION

In a conventional plasma welding and cutting tool or gun, an operating gas is ionized by an arc formed between a nozzle and a electrode of different electrodes to form plasma for welding and cutting work pieces. Since there is not provided with any device in a welding or cutting gun to keep a constant operating pressure for the operating gas from a gas inlet towards a discharge orifice at the nozzle, the fluctuation of inlet gas pressure may influence the plasma velocity and temperature through the nozzle orifice to cause temperature fluctuations of the plasma towards the work piece, thereby being unable to perform the welding and cutting operation at constant operating temperature, resulting in poor quality and efficiency of the welding and cutting job, and resulting in unhomogeneous stress or strength of finished work piece under unstable operating condition deteriorate the reliability and durability of the engineering or product by the conventional welding and cutting gun.

SUMMARY OF THE INVENTION

The object of the present invention is to provide a plasma welding and cutting gun for discharging plasma gas with constant outlet pressure including a gun body having a negative-electrode jacket for directing welding and cutting gas into the gun, a core tube through which the gas flows through a gas outlet of the negative-electrode jacket disposed around the core tube and then discharged through a nozzle secured to a lower portion of the gun body, and a positive-electrode sleeve secured to an outer portion of the gun body and connected to the nozzle, wherein the nozzle serves as a positive-electrode terminal and the gas directed into a passage between the nozzle and a negative-electrode terminal secured to a lower portion of the negative-electrode jacket will be ionized by an arc formed between the nozzle and the negative-electrode terminal, and then discharged through the nozzle to form plasma arc of high temperature and high velocity for welding and cutting a work piece, and wherein an over-pressure relief valve is provided between the core tube and negative-electrode jacket for discharging a gas streamflow through a by-pass gas discharge passage when a main gas streamflow having its pressure exceeding a pre-determined constant pressure, thereby keeping a constant gas pressure for the plasma main gas streamflow in order to enhance the stability and quality of plasma welding and cutting.

DETAILED DESCRIPTION

Figure 1:
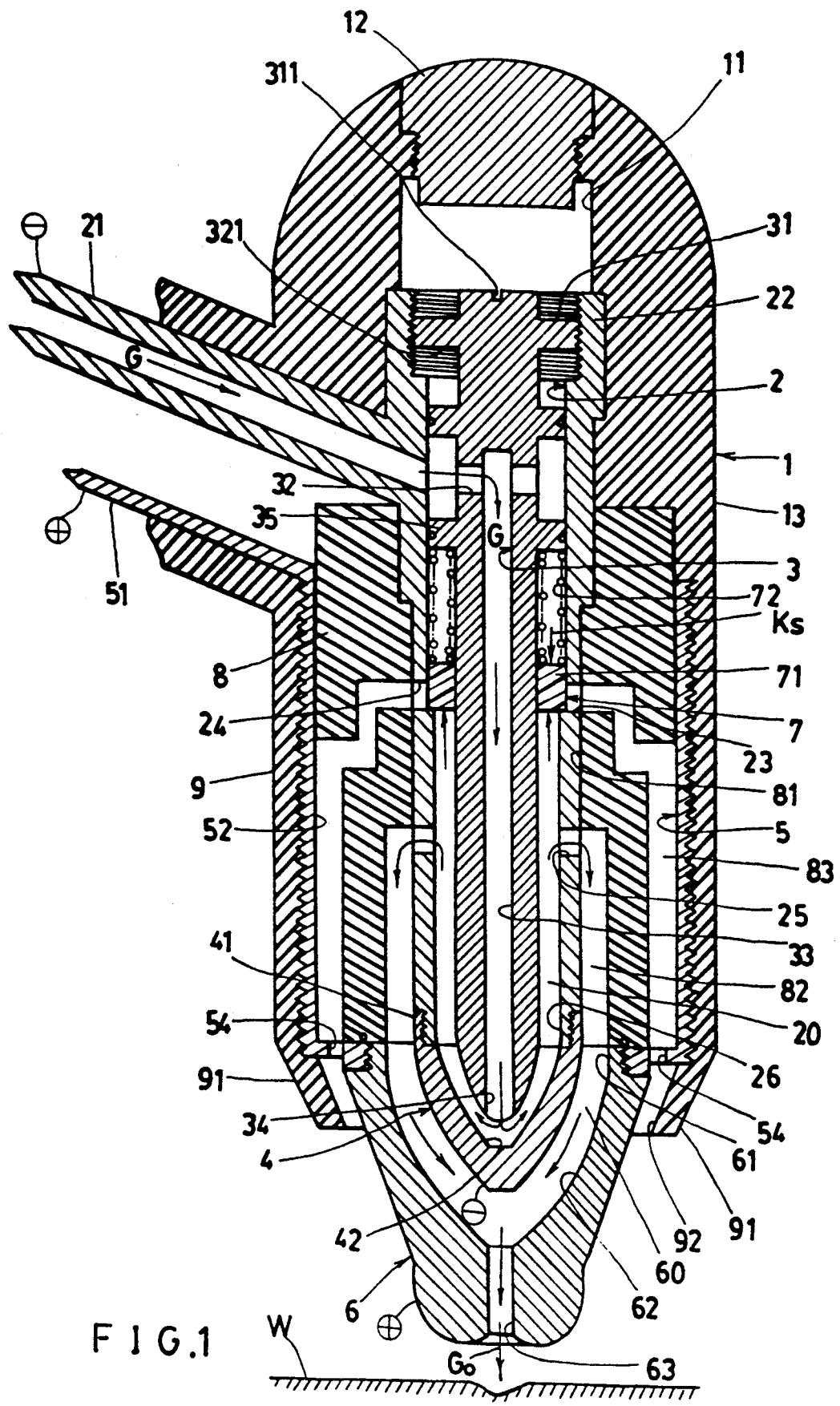
FIG. 1 is a sectional drawing of the present invention.
Figure 2:
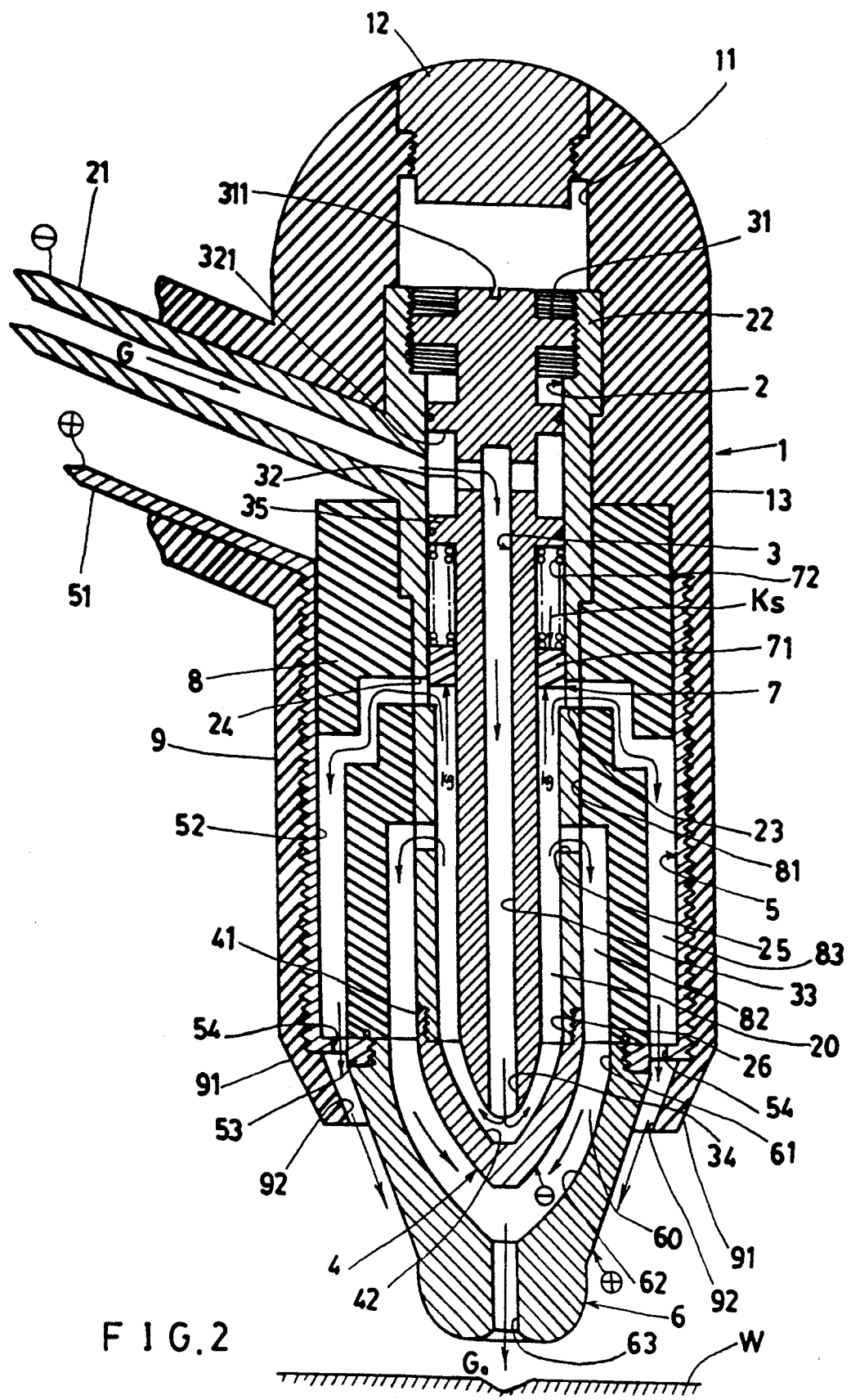
FIG. 2 is an illustration showing a discharge of an overpressure gas in accordance with the present invnetion.

As shown in FIGS. 1 and 2, the present invention comprises: a gun body 1; a negative-electrode jacket 2 secured to an inner portion of the gun body 1 for directing a welding and cutting gas G into the gun body 1 and connected to a negative-electrode of a power supply (not shown); a core tube 3 secured to and positioned in a central portion of the negative-electrode jacket 2 for directing the welding and cutting into the core tube 3 from the negative-electrode jacket 2 for reducing an inlet gas pressure and then discharging the welding and cutting gas through the core tube 3 and a gas outlet of the negative-electrode jacket 2; a negative-electrode terminal 4 connected to a lower portion of the negative-electrode jacket 2 and disposed around a bottom portion of the core tube 3; a positive-electrode sleeve 5 connected to a positive electrode of the power supply and secured to an outer portion of the gun body 1, the positive-electrode sleeve 5 being insulated from the negative-electrode jacket 2 by an insulator means comprised of an inner insulator 8 and an outer insulator 9; a nozzle 6 secured to a lower portion of the positive-electrode sleeve 5 and positioned below the negative-electrode terminal 4 forming a main gas ionization passage 60 between the nozzle 6 and the negative-electrode terminal 4 for ionizing a main gas streamflow of the welding and cutting gas G in the main gas ionization passage 60 to form plasma Go which is discharged from a plasma orifice 63 in the nozzle 6 towards a work piece W for welding and cutting the work piece W, and an over-pressure relief valve 7 provided between the core tube 3 and the negative-electrode jacket 2 for normally sealing an over-pressure venting hole 24 which is provided for delivering the main gas streamflow to be ionized for obtaining the plasma Go ejected towards the work piece W, and is formed in the negative-electrode jacekt 2 when the main gas streamflow has a pressure equal to or not exceeding a pre-determined constant pressure set on the over-pressure relief valve 7, whereby if a pressure of the main gas flowing to the nozzle 6 is higher than the predetermined constant pressure set by the over-pressure relief valve 7, the over-pressure relief valve 7 will be open to discharge a by-pass gas streamflow through the over-pressure venting hole 24 to finally form a shielding gas G, surrounding the plasma Go when released from a by-pass gas discharge passage (83, 92) formed in the insulator means 8, 9.

The negative-electrode jacket 2 secured in a central barrel 11 of the gun body 1 includes: a gas inlet tube 21 for directing a welding and cutting inlet gas G into the gun for producing plasma, the gas inlet tube 21 being electrically connected to a negative electrode of a power supply; an upper tube portion 22 engaged with a core-tube connector 31 of the core tube 3; a valve seat 23 formed on a middle portion of the negative-electrode jacket 2; an over-pressure venting hole 24 formed in a middle portion of the negative-electrode jacket 2 and adjacent to the valve seat 23; and a main gas discharge hole 25 formed in a lower portion of the negative-electrode jacket 2 for delivering a main gas streamflow to the nozzle 6 to be discharged from the nozzle 6 towards the work piece W to form the plasma Go for welding and cutting the work piece W through a main gas passage 20 formed between the lower tube portion 26 of the negative-electrode jacket 2 and the core tube 3, with the lower tube portion 26 connected to the negative-electrode terminal 4.

The core tube 3 includes: a gas inlet port 321 annularly recessed in an upper portion of a core-tube connector 31 secured to the negative-electrode jacket 2, a central gas passage 33 longitudinally formed in a central portion of the core tube 3 having a gas inlet orifice 32 formed in an upper portion of the core tube 3 communicating with the gas inlet port 321 having a diameter of the gas inlet orifice 32 smaller than that of the gas inlet port 321 for reducing pressure of the inlet gas for forming a main gas streamflow flowing in the central gas passage 33, and a bottom gas outlet 34 formed in a bottom portion of the core tube 3 for directing the main gas streamflow from the central gas passage 33 into the main gas passage 20 between the negative-electrode jacket 2 and the core tube 3 for discharging the main gas streamflow outwardly.

The core-tube connector 31 of the core tube 3 is formed with the male threads to be engaged with an upper tube portion 22 of the negative-electrode jacket 2 formed with female threads in the upper tube portion 22, having a recess 311 formed in a top portion of the core-tube connector 31 to be engaged with a tool such as a driver for rotatably driving the core-tube connector 31 after removing a top plug 12 sealing a top portion of the gun body 1, and for rotating the core tube 3 for adjusting a predetermined constant pressure of the over-pressure relief valve 7.

The over-pressure relief valve 7 includes a valve plug 71 normally seated on a valve seat 23 of the negative-electrode jacket 2, and a tension spring 72 retained between a spring holder 35 of the core tube 3 and the valve plug 71 for normally sealing the valve plug 71 on the valve seat 23 for sealing the over-pressure venting hole 24 as shown in FIG. 1. In such a normal case, a pressure Ks applied onto the valve plug 71 by the tension spring 72 should be equal to a predetermined or pre-set constant pressure Kg of the main gas streamflow supplied outwardly for welding and cutting work piece W.

Accordingly, if the pressure of the main gas streamflow flowing to the nozzle 6 is higher than Ks, the valve plug 71 will be opened from the valve seat 23 and then a by-pass gas streamflow G1 will be discharged out of the gun body 1 through the over-pressure venting hole 24.

The negative-electrode terminal 4 includes a terminal connector 41 secured to and electrically connected to the lower tube portion 26 of the negative-electrode jacket 2, and a conical cap 42 tapered downwardly towards the nozzle 6 and disposed around the lower portion of the core tube 3, thereby forming a main gas deflecting passage between the conical cap 42 and a bottom portion of the core tube 3 to be communicated with the main gas passage 20 between the negative-electrode jacket 2 and the core tube 3 for discharging the main gas streamflow outwardly.

The positive-electrode sleeve 5 includes: a positive-electrode connector 51 connected to a positive electrode of the power supply, a central sleeve portion 52 connected to a lower body portion 13 of the gun body 1, having an outer insulator 9 electrically insulatively connected between the positive-electrode sleeve 5 and the gun body 1, a lower sleeve connector 53 connected with a nozzle connector 61 of the nozzle 6, and a plurality of by-pass discharge holes 54 annularly formed in a lower periphery of the central sleeve portion 52 to be communicated with the over-pressure venting hole 24 of the negative-electrode jacket 2.

An inner insulator 8 is inserted in between the positive-electrode sleeve 5 and the negative-electrode jacket 2 and is formed with a central hole 81 engageable with the negative-electrode jacekt 2, a main gas discharge passage 82 enlarged from a lower portion of the central hole 81 of the inner insulator and circumferentially disposed around a lower portion 26 of the negative-electrode jacket 2 and communicating with a main gas discharge hole 25 formed in the negative-electrode jacket 2, and a by-pass gas discharge passage 83 internally formed through the inner insulator 8 to be positioned in an outer portion of the inner insulator 8 outside the main gas discharge passage 82 and confined within the positive-electrode sleeve 5 to be communicated with the over-pressure venting hole 24 of the negative-electrode jacket 2.

The positive-electrode sleeve 5 is jacketed with an outer insulator 9 to prevent from being grounded having a lower periphery of the sleeve 5 being surrounded by a protective cap 91 of the outer insulator 9. The outer insulator 9 has a by-pass gas tail passage 92 formed between an inside wall of the protective cap 91 and the nozzle 6 to be communicated with the by-pass gas discharge passage 83 formed between the positive-electrode sleeve 5 and the inner insulator 8 to discharge a bypass gas streamflow G1 as released from the over-pressure relief valve 7 due to over-pressure of the main gas streamflow, spraying a shielding gas downwardly for surrounding and shielding the plasma discharged from the nozzle 6 to the work piece W.

The nozzle 6 is tapered downwardly from a lower portion of the positive-electrode sleeve 5 to form a nozzle conical portion 62 of which a plasma orifice 63 is formed through a central lower portion of the nozzle 6 for discharging the plasma Go to the work piece W for welding and cutting the work piece. A main gas ionization passage 60 is formed between the nozzle conical portion 62 and the negative-electrode terminal 4 for ionizing the main gas streamflow passing through the main gas ionization passage 60, through which an ionized gas streamflow will be discharged through the plasma orifice 63 towards the work piece W for providing the plasma Go for welding and cutting the work piece W.

In the present invention, several packing rings, such as 0 rings, can be used in any relevant connecting, coupling or engaging parts to prevent gas leakage or loss.

When using the present invention, an inlet gas G is directed from the gas inlet tube 21 into the central gas passage 33 of the core tube 3 through the gas inlet port 321 and the gas inlet orifice 32 to form a main gas streamflow flowing downwardly through the central gas passsage 33 and then flowing upwardly into the main gas passage 20 between the core tube 3 and the negative-electrode jacket 2. When the gas pressure in the main gas passage 20 is not exceeding a preset pressure such as 3.5 $Kg/cm^2$ of the valve plug 71, the main gas streamflow will continuously flow through the main gas discharge hole 25, the main gas discharge passage 82 and the main gas ionization passage 60 wherein the main gas streamflow is ionized and ejected downwardly through the plasma orifice 63 towards the work piece W for producing plasma Go of high velocity and high temperature for welding and cutting for the work piece W.

If the pressure of the main gas G is, for instance 5 $Kg/cm^2$, higher than the preset constant pressure Kg, such as 3.5 $Kg/cm^2$, the valve plug 71 will be lifted and opened to consequently discharge the by-pass gas G1 through the over-pressure venting hole 24, the by-pass gas discharge passage 83 and the by-pass gas tail passage 92 to form a shielding gas surrounding the plasma discharged from the nozzle 6 to prevent the oxidization of the processing area of the work piece W during the welding and cutting of the work piece W by precluding oxygen in contact with the work piece W. Moreover, the by-pass gas G1 can cool the nozzle 6 and purge scraps or dusts occuring in the welding and cutting job for cleaning the work piece W for keeping a better appearance of the processed work piece W and prolonging the service life of the nozzle 6.

The present invention may be modified by those skilled in the art without departing from the spirit and scope of this invention.

I claim:

1. A plasma welding and cutting gun comprising:

a gun body; a negative-electrode jacket secured to an inner portion of said gun body for directing a welding and cutting gas into said gun body and connected to a negative-electrode of a power supply; a core tube secured to and positioned in a central portion of said negative-electrode jacket for directing the welding and cutting into said core tube from said negative-electrode jacket for reducing an inlet gas pressure and then discharging the welding and cutting gas through said core tube and a gas outlet of said negative-electrode jacket; a negative-electrode terminal connected to a lower portion of said negative-electrode jacket and disposed around a bottom portion of said core tube; a positive-electrode sleeve connected to a positive electrode of the power supply and secured to an outer portion of said gun body, said positive-electrode sleeve being insulated from said nagative-electrode jacket by an insulator means comprised of an inner insulator and an outer insulator; a nozzle secured to lower portion of said positive-electrode sleeve and positioned below said negative-electrode terminal forming a main gas ionization passage between said nozzle and said negative-electrode terminal for ionizing a main gas streamflow of the welding and cutting gas in said main gas ionization passage to form plasma which is discharged from a plasma orifice in said nozzle towards a work piece for welding and cutting said work piece, and an over-pressure relief valve provided between said core tube and said negative-electrode jacket for normally sealing an over-pressure venting hole which is provided for delivering the main gas streamflow to be ionized for obtaining plasma ejected towards said work piece, and is formed in said negative-electrode jacket when the main gas streamflow has a pressure equal to or not exceeding a predetermined constant pressure set on said over-pressure relief valve, whereby if a pressure of the main gas flowing to said nozzle is higher than the pre-determined constant pressure set by the over-pressure relief valve, the over-pressure relief valve will be open to discharge a by-pass gas streamflow through the over-pressure venting hole to finally form a shielding gas, surrounding the plasma when released from a by-pass gas discharge passage formed in said insulator means.

2. A plasma welding and cutting gun according to claim 1, wherein said negative-electrode jacket secured in a central barrel of said gun body includes: a gas inlet tube for directing a welding and cutting inlet gas into the gun for producing plasma, said gas inlet tube being electrically connected to a negative electrode of a power supply; an upper tube portion engaged with a core-tube connector of said core tube; a valve seat formed on a middle portion of said negative-electrode jacket; an over-pressure venting hole formed in a middle portion of said negative-electrode jacket and adjacent to said valve seat; and a main gas discharge hole formed in a lower portion of said negative-electrode jacket for delivering a main gas streamflow to said nozzle to be discharged from said nozzle towards said work piece to form the plasma for welding and cutting said work piece through a main gas passage formed between said lower tube portion of said negative-electrode jacket and said core tube, with said lower tube portion connected to said negative-electrode terminal.

3. A plasma welding and cutting gun according to claim 2, wherein said core tube includes: a gas inlet port annularly recessed in an upper portion of a core-tube connector secured to said negative-electrode jacket, a central gas passage longitudinally formed in a central portion of said core tube having a gas inlet orifice formed in an upper portion of said core tube communicating with said gas inlet port having a diameter of said gas inlet orifice smaller than that of said gas inlet port for reducing pressure of the inlet gas for forming a main gas streamflow flowing in said central gas passage, and a bottom gas outlet formed in a bottom portion of said core tube for directing the main gas streamflow from said central gas passage into said main gas passage between said negative-electrode jacket and said core tube for discharging the main gas streamflow outwardly.

4. A plasma welding and cutting gun according to claim 3, wherein said core-tube connector of said core tube is formed with the male threads to be engaged with an upper tube portion of said negative-electrode jacket formed with female threads in said upper tube portion, having a recess formed in a top portion of said core-tube connector to be engaged with a tool for rotatably driving said core-tube connector after removing a top plug sealing a top portion of said gun body, and for rotating said core tube for adjusting a pre-determined constant pressure of said over-pressure relief valve.

5. A plasma welding and cutting gun according to claim 1, wherein said over-pressure relief valve includes a valve plug normally seated on a valve seat of said negative-electrode jacket, and a tension spring retained between a spring holder of said core tube and said valve plug for normally sealing said valve plug on said valve seat for sealing said over-pressure venting hole, a pressure Ks applied onto said valve plug by said tension spring being equal to a predetermined constant pressure Kg of the main gas streamflow supplied outwardly for welding and cutting work piece.

6. A plasma welding and cutting gun according to claim 2, wherein said negative-electrode terminal includes a terminal connector secured to and electrically connected to said lower tube portion of said negative-electrode jacket, and a conical cap tapered downwardly towards said nozzle and disposed around the lower portion of said core tube, thereby forming a main gas deflecting passage between said conical cap and a bottom portion of said core tube to be communicated with said main gas passage between said negative-electrode jacket and said core tube for discharging said main gas streamflow outwardly.

7. A plasma welding and cutting gun according to claim 1, wherein said positive-electrode sleeve includes: a positive-electrode connector connected to a positive electrode of the power supply, a central sleeve portion connected to a lower body portion of said gun body, having an outer insulator electrically insulatively connected between said positive-electrode sleeve and said gun body, a lower sleeve connector connected with a nozzle connector of said nozzle, and a plurality of by-pass discharge holes annularly formed in a lower periphery of said central sleeve portion to be communicated with said over-pressure venting hole of said negative-electrode jacket.

8. A plasma welding and cutting gun according to claim 1, wherein said inner insulator is inserted in between said positive-electrode sleeve and said negative-electrode jacket and is formed with a central hole engageable with said negative-electrode jacekt, a main gas discharge passage enlarged from a lower portion of said central hole of the inner insulator and circumferentially disposed around a lower portion of said negative-electrode jacket and communicating with a main gas discharge hole formed in said negative-electrode jacket, and a by-pass gas discharge passage internally formed through said inner insulator to be positioned in an outer portion of said inner insulator outside said main gas discharge passage and confined within said positive-electrode sleeve to be communicated with said over-pressure venting hole of said negative-electrode jacket.

9. A plasma welding and cutting gun according to claim 7, wherein said positive-electrode sleeve is jacketed with an outer insulator to prevent from being grounded having a lower periphery of said sleeve being surrounded by a protective cap of said outer insulator, said outer insulator having a by-pass gas tail passage formed between an inside wall of said protective cap and said nozzle to be communicated with the by-pass gas discharge passage formed between said positive-electrode sleeve and said inner insulator to discharge a by-pass gas streamflow as released from said over-pressure relief valve due to over-pressure of the main gas streamflow, spraying a shielding gas downwardly for surrounding and shielding the plasma discharged from said nozzle to said work piece.

10. A plasma welding and cutting gun according to claim 1, wherein said nozzle is tapered downwardly from a lower portion of said positive-electrode sleeve to form a nozzle conical portion of which a plasma orifice is formed through a central lower portion of said nozzle for discharging said plasma to said work piece for welding and cutting said work piece, and a main gas ionization passage formed between said nozzle conical portion and said negative-electrode terminal for ionizing said main gas streamflow passing through said main gas ionization passage, through which an ionized gas streamflow is discharged through said plasma orifice towards said work piece for providing said plasma for welding and cutting said work piece.

* * * * *